US009497250B2

(12) United States Patent
Branson et al.

(10) Patent No.: US 9,497,250 B2
(45) Date of Patent: Nov. 15, 2016

(54) RUNTIME GROUPING OF TUPLES IN A STREAMING APPLICATION

(71) Applicant: International Business Machines Corporation, Armonk, NY (US)

(72) Inventors: Michael J. Branson, Rochester, MN (US); Bradford L. Cobb, Cedar Park, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 13/662,931

(22) Filed: Oct. 29, 2012

(65) Prior Publication Data

US 2014/0122557 A1    May 1, 2014

(51) Int. Cl.
| H04L 29/06 | (2006.01) |
| H04L 29/08 | (2006.01) |
| H04L 12/26 | (2006.01) |
| G06F 17/30 | (2006.01) |

(52) U.S. Cl.
CPC ......... *H04L 67/02* (2013.01); *G06F 17/30516* (2013.01); *H04L 67/2833* (2013.01); *H04L 69/22* (2013.01); *G06F 17/30474* (2013.01); *H04L 43/022* (2013.01)

(58) Field of Classification Search
CPC .............................. H04L 43/022; H04L 65/60
USPC .......................................... 709/201, 202, 203
See application file for complete search history.

(56) References Cited

U.S. PATENT DOCUMENTS

| 5,404,541 | A | 4/1995 | Hirosawa et al. |
| 6,243,755 | B1 | 6/2001 | Takagi et al. |
| 7,613,848 | B2 | 11/2009 | Amini et al. |
| 7,644,110 | B2 | 1/2010 | Nishizawa et al. |
| 7,877,401 | B1 | 1/2011 | Hostetter et al. |
| 8,095,690 | B2 | 1/2012 | Kashiyama et al. |
| 8,112,541 | B2 | 2/2012 | Amini et al. |
| 2006/0004996 | A1 | 1/2006 | Gonion |
| 2007/0226239 | A1* | 9/2007 | Johnson ................ H04L 43/022 |
| 2008/0052266 | A1* | 2/2008 | Goldstein ......... G06F 17/30474 |
| 2008/0134158 | A1 | 6/2008 | Salz et al. |
| 2009/0248749 | A1 | 10/2009 | Gu et al. |
| 2009/0300615 | A1 | 12/2009 | Andrade et al. |
| 2010/0106946 | A1 | 4/2010 | Imaki et al. |
| 2010/0138438 | A1 | 6/2010 | Torikai et al. |

(Continued)

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.

(Continued)

*Primary Examiner* — Barbara Burgess
(74) *Attorney, Agent, or Firm* — Joseph W. Cruz

(57) ABSTRACT

A system and method for modifying the processing within a streaming application are disclosed. The method may include identifying a grouping location at which it may be possible to group tuples during the runtime execution of a streaming application. In some embodiments, this may include identifying locations at which a runtime grouping condition may be added to one or more stream operators without adversely affecting the performance of a streaming application. The method may add a runtime grouping condition to a processing location within the plurality of stream operators of a streaming application, in some embodiments.

10 Claims, 10 Drawing Sheets

(56) References Cited

U.S. PATENT DOCUMENTS

| | | |
|---|---|---|
| 2010/0229178 A1 | 9/2010 | Ito |
| 2010/0293532 A1* | 11/2010 | Andrade ............ G06F 11/1438 717/140 |
| 2010/0318768 A1 | 12/2010 | Bouillet et al. |
| 2011/0016160 A1 | 1/2011 | Zhang et al. |
| 2011/0040709 A1 | 2/2011 | Proctor et al. |
| 2011/0040827 A1 | 2/2011 | Katsunuma et al. |
| 2011/0314019 A1 | 12/2011 | Jimenez Peris et al. |
| 2012/0002733 A1* | 1/2012 | Misra ................. H04N 21/4516 375/259 |
| 2012/0078951 A1 | 3/2012 | Hsu et al. |
| 2012/0078975 A1 | 3/2012 | Chen et al. |
| 2012/0079466 A1 | 3/2012 | Gonion |
| 2012/0218268 A1 | 8/2012 | Accola et al. |
| 2012/0297168 A1 | 11/2012 | Chen et al. |
| 2013/0018885 A1 | 1/2013 | Guenkova-Luy |
| 2013/0159980 A1 | 6/2013 | Braude |
| 2013/0166617 A1 | 6/2013 | Branson et al. |
| 2013/0166618 A1 | 6/2013 | Branson et al. |
| 2013/0305225 A1 | 11/2013 | Branson et al. |
| 2014/0089929 A1* | 3/2014 | Branson ................. H04L 69/22 718/102 |
| 2014/0095503 A1* | 4/2014 | Branson ............ G06F 17/30516 707/737 |
| 2014/0095506 A1 | 4/2014 | Branson et al. |
| 2014/0122559 A1 | 5/2014 | Branson et al. |

OTHER PUBLICATIONS

Santosuosso et al., "Management System for Processing Streaming Data", filed Jul. 26, 2011. U.S. Appl. No. 13/190,810.

IBM, "IBM Streams Processing Language Compiler Usage Reference", IBM InfoSphere Streams Version 2.0.0.4, © IBM Corporation 2011, 2012. http://publib.boulder.ibm.com/infocenter/streams/v2r0/topic/com.ibm.swg.im.infosphere.streams.product.doc/doc/IBMInfoSphereStreams-SPLCompilerUsageReference.pdf.

IBM, "Installation and Administration Guide", IBM Infosphere Streams Verson 1.2.1, @IBM Corporation 2009, 2010 http://www-01.ibm.com/support/docview.wss?uid=swg27018039&aid=1.

Branson et al., "Compile-Time Grouping of Tuples in a Streaming Application", U.S. Appl. No. 13/631,086, filed Sep. 28, 2012.

Gedik et al., "SPADE: The System S Declarative Stream Processing Engine", 2008, ACM, SIGMOD '08 Jun. 9-12, 2008, pp. 1123-1134.

* cited by examiner

RUNTIME GROUPING OF TUPLES IN A STREAMING APPLICATION

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program receive streaming data to be processed by a plurality of processing elements comprising one or more stream operators.

One embodiment is directed to a method for processing a stream of tuples in a streaming application. The method may include identifying a grouping location at which it may be possible to group tuples during the runtime execution of a streaming application. In some embodiments, this may include identifying locations at which a runtime grouping condition may be added to one or more stream operators without adversely affecting the performance of a streaming application. The method may add a runtime grouping condition to a processing location within the plurality of stream operators of a streaming application in some embodiments.

Another embodiment is directed to a system for processing a stream of tuples in a streaming application. The system may include a plurality of stream operators. The system may identify a grouping location at which it may be possible to group tuples during the runtime execution of a streaming application. In some embodiments, this may include identifying locations at which a runtime grouping condition may be added to one or more stream operators without adversely affecting the performance of a streaming application. The system may add a runtime grouping condition to a processing location within the plurality of stream operators of a streaming application in some embodiments.

Yet another embodiment is directed to a computer program product.

BRIEF DESCRIPTION OF THE DRAWINGS

Like reference numbers and designations in the various drawings indicate like elements.

DETAILED DESCRIPTION

Figure 1:
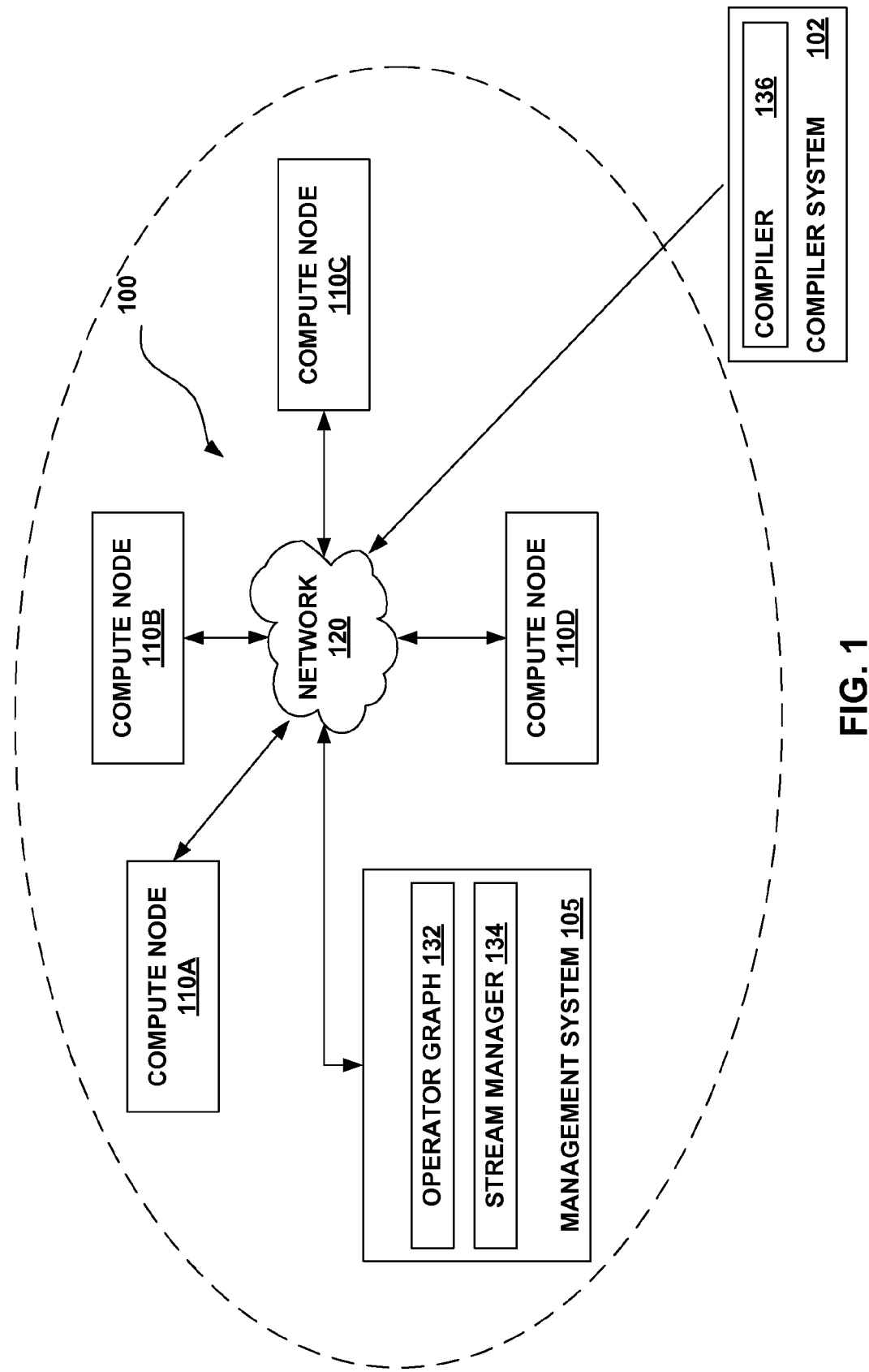
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Stream operators may be classified into levels. A level, as referred to herein, may be defined as a number of subsequent stream operators from a particular stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with a thing. Examples of attributes may be any of a variety of different types, e.g., integer, float, Boolean, string, etc. The attributes may be ordered. A tuple may be extended by adding one or more additional attributes to it. In addition to attributes associated with a thing, a tuple may include metadata, i.e., data about the tuple. As used herein, "stream" or "data stream" refers to a sequence of tuples. Generally, a stream may be considered a pseudo-infinite sequence of tuples.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

Embodiments disclosed herein are directed to methods and systems that enhance the ability of a streaming application to efficiently and rapidly process a received data stream. In one embodiment, a grouping location may be identified at which tuples may be grouped without adversely affecting the performance of the streaming application. It may be possible to add a runtime grouping condition to a stream operator in order to specify that tuples be grouped prior to sending to another stream operator. A runtime grouping condition may be added to a processing location, which may be the same as or different than the grouping location, within an operator graph of a streaming application if a grouping location was identified. A runtime grouping condition may improve the performance of a streaming application by reducing the calls to the transport layer during the runtime of the streaming application.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
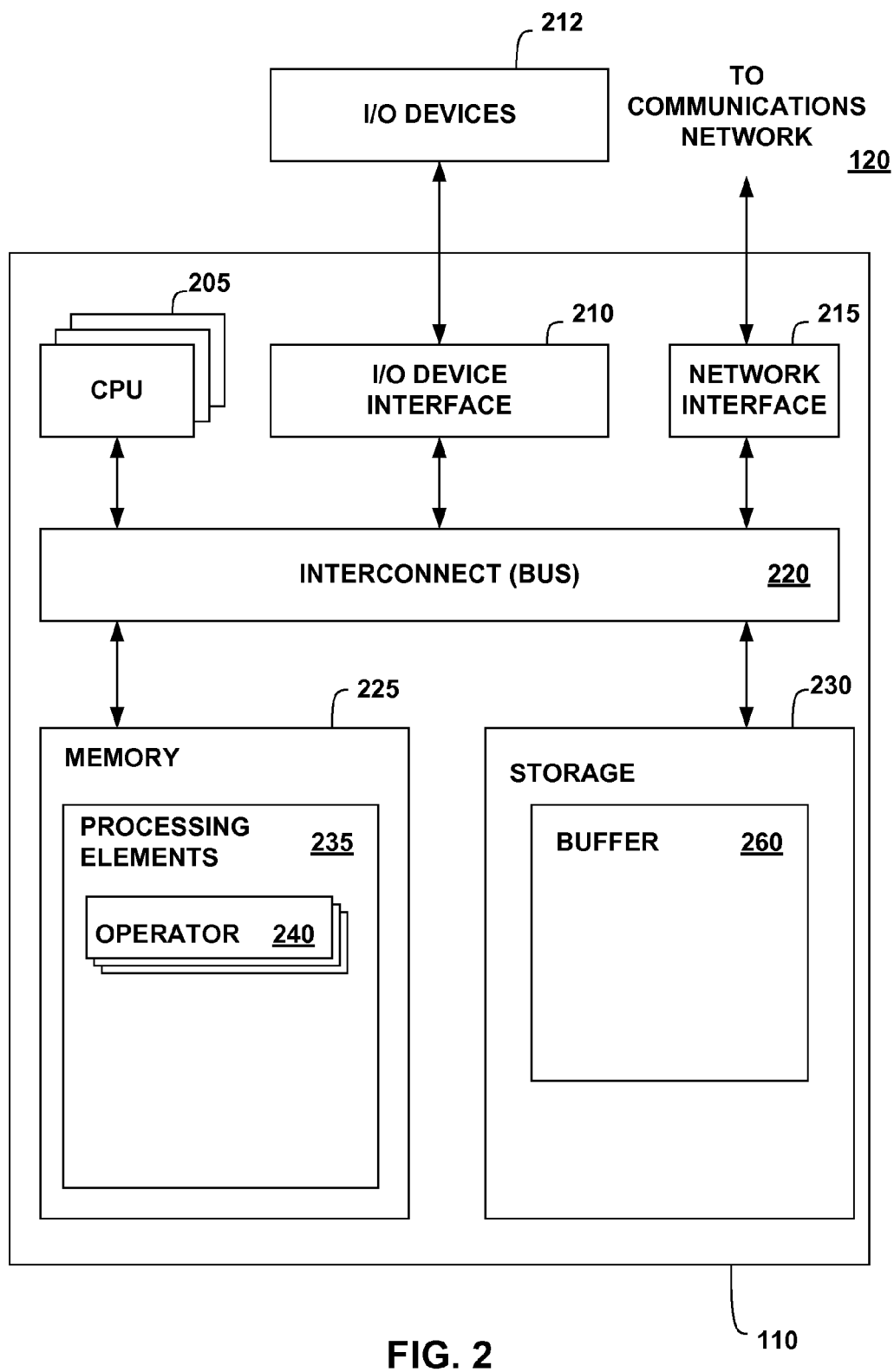
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
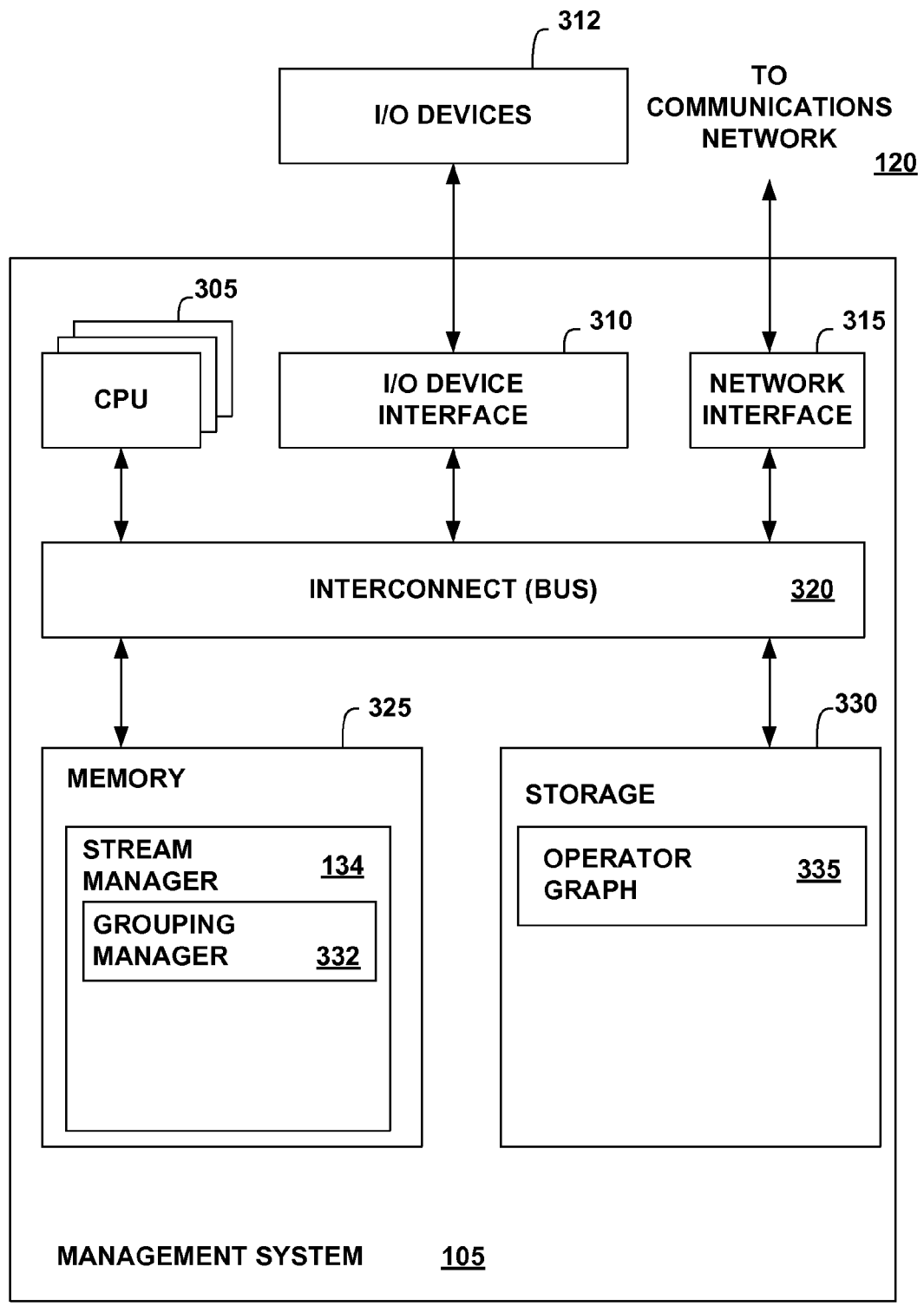
FIG. 3 illustrates a more detailed view of the management system of FIG. 1 according to various embodiments.

FIG. 3 is a more detailed view of the management system 105 of FIG. 1, according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 305, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing. In some embodiments, the stream manager 134 may also include a grouping manager 332, which may be configured to monitor and group tuples during the runtime execution of a streaming application. The grouping manager 332 may identify one or more locations within the operator graph 335 at which it may be possible to group two or more tuples. In some embodiments, a location, referred to hereinafter as a grouping location, within the operator graph 335 at which grouping may be possible may include one or more stream operators, one or more groups of stream operators, one or more processing elements, one or more groups of processing elements, or one or more compute nodes. The grouping manager 332 may also modify the processing at one or more stream operators within the identified locations such that tuples are grouped prior to sending to another one or more stream operators during runtime. It may be possible, in some embodiments, to group tuples at one or more stream operators that are not within the location identified by the grouping manager 332. In some embodiments, identifying a location within the operator graph 335 at which grouping may be possible may include identifying: an output pattern, a runtime grouping condition that may be optimized, or a system limitation, such as low network bandwidth. The identification of various locations where grouping of tuples may be possible will be described in further detail below. A location where grouping may be possible may be identified, in some embodiments, using all, none, or any combination of these identification methods.

The grouping manager 332 may modify processing by adding a runtime grouping condition. A runtime grouping condition, as referred to herein, may identify a condition added during runtime to instruct a particular stream operator or group of operators to group tuples prior to sending to another stream operator or group of stream operators. The performance of the streaming application may be improved by applying one or more runtime grouping conditions to the operator graph 335. For example, a runtime grouping condition may reduce the number of calls to the transport layer, which may result in improved application performance.

Figure 4:
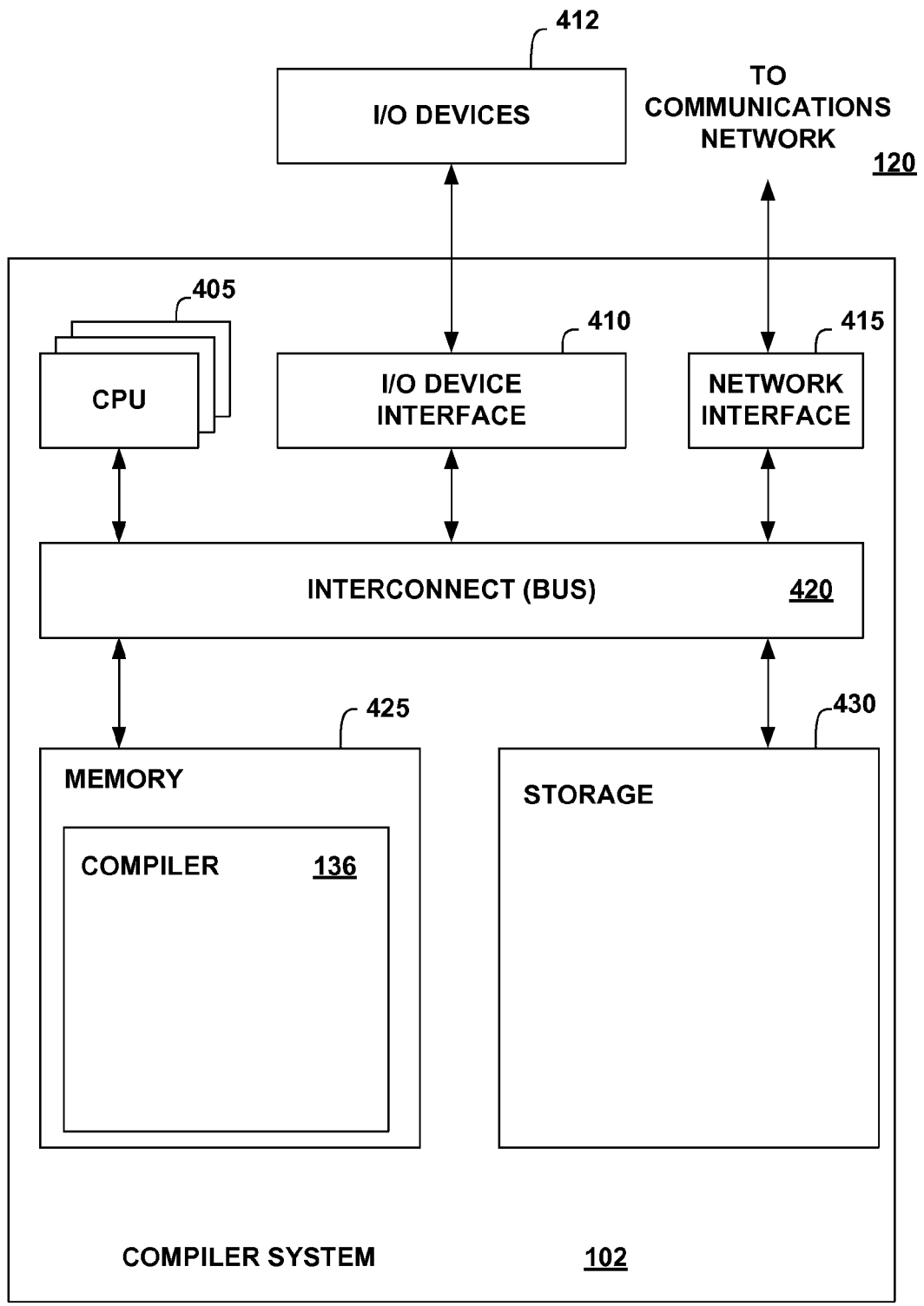
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
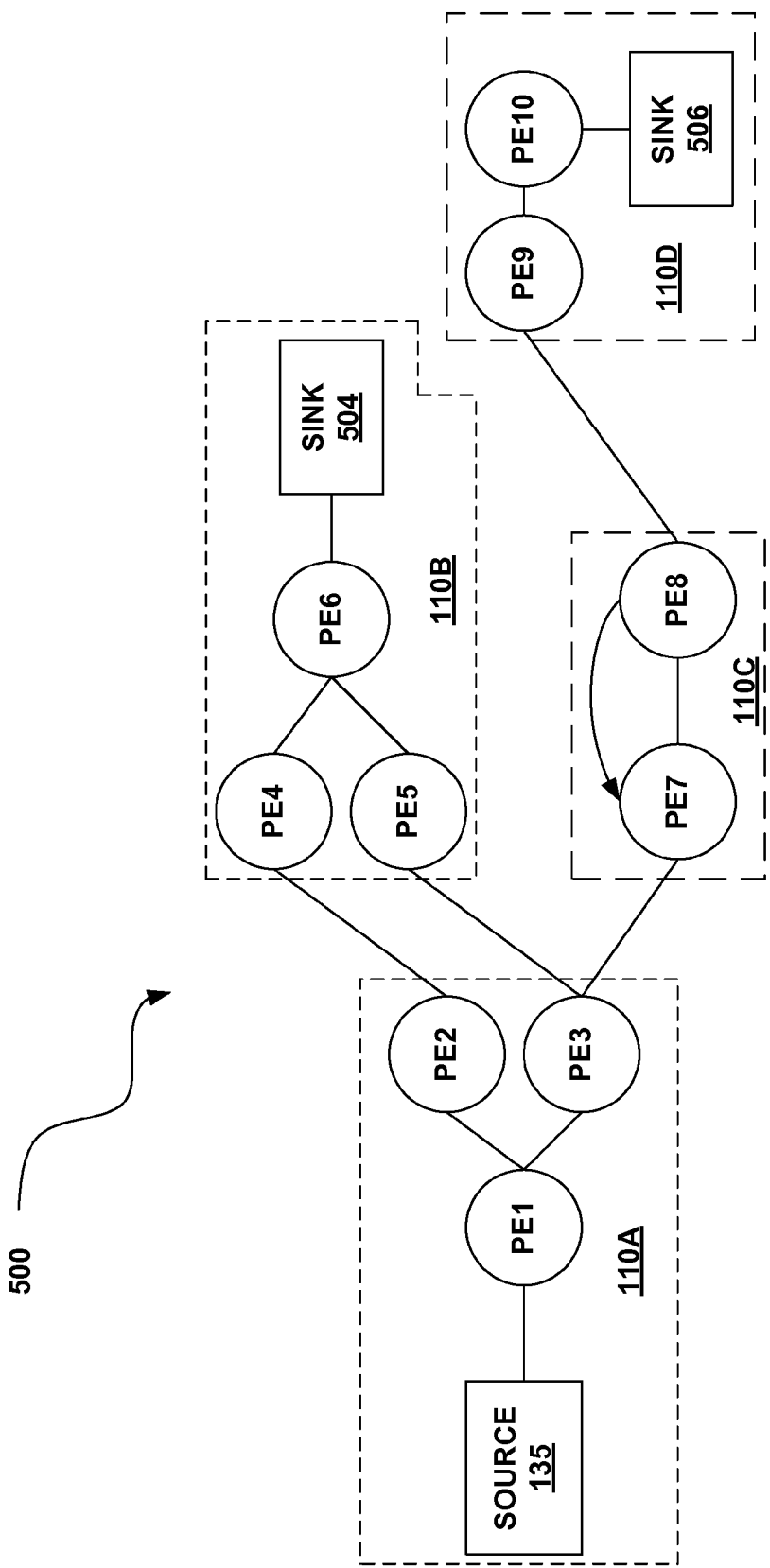
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Data that flows to PE2 is processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D. One example of a stream computing application is IBM®'s InfoSphere® Streams (note that InfoSphere® is a trademark of International Business Machines Corporation, registered in many jurisdictions worldwide).

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
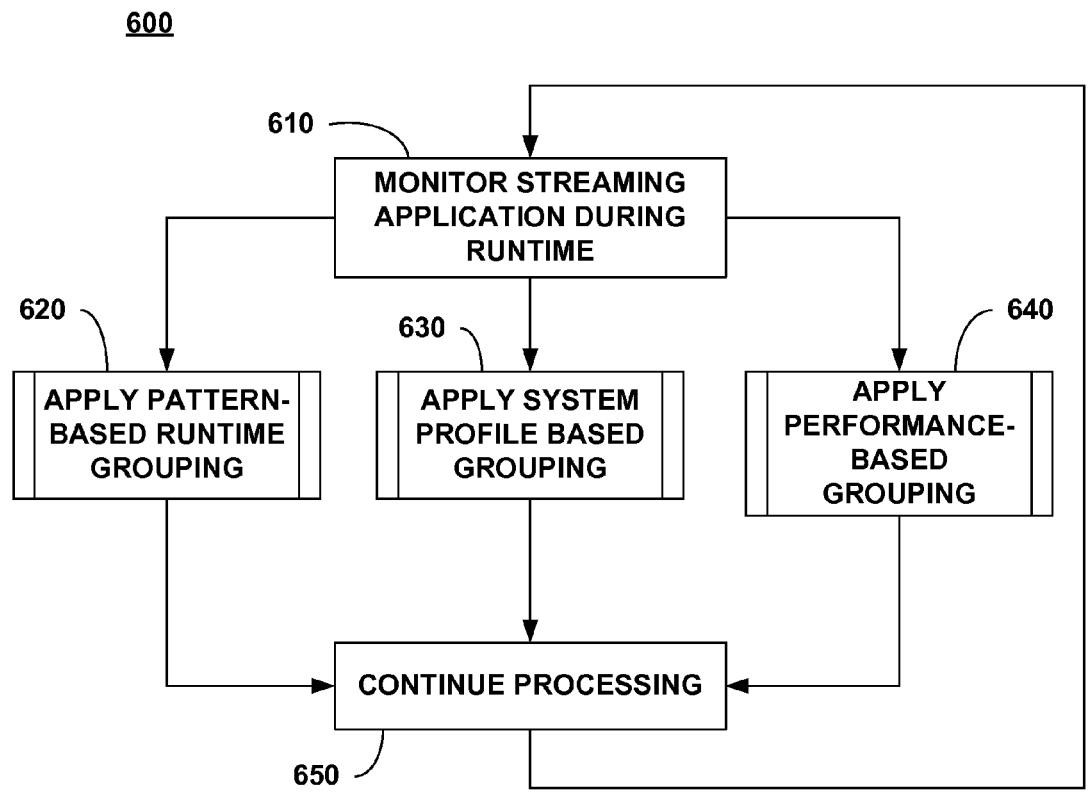
FIG. 6 illustrates a method for grouping tuples during runtime according to various embodiments.

FIG. 6 is a flowchart illustrating a method 600 for modifying processing of a data stream, according to some embodiments. Generally, the operations of the method 600 may modify the processing of a stream of tuples within an operator graph by identifying one or more locations where it may be possible to group tuples prior to sending in an attempt to improve the overall performance of the streaming application. In some embodiments, processing may be modified by grouping tuples and adding one or more runtime grouping conditions to one or more stream operators based on the identification. Runtime grouping conditions may be added during the runtime execution of a streaming application. The addition of one or more runtime grouping conditions may include monitoring a streaming application during runtime through the use of a grouping manager, such as grouping manager 332 (FIG. 3), in some embodiments. The grouping manager 332 may add one or more runtime grouping conditions to one or more stream operators at one or more of the grouping locations identified by the grouping manager 332. Alternatively, one or more runtime grouping conditions may be added to one or more stream operators at a processing location, which may be the same as or different than the grouping location identified by the grouping manager 332. A runtime grouping condition may specify that tuples be grouped based on the manner of identifying a location with potential for grouping. In some embodiments, identifying a grouping location where grouping tuples may improve the performance of a streaming application may be based on: patterns exhibited during the runtime of the streaming application (discussed in further detail at operation 700), performance guided trial and error (discussed in further detail at operation 800), or characteristics related to a system profile (discussed in further detail at operation 900).

At operation 610, a streaming application may be monitored during its runtime execution, according to some embodiments. Monitoring a streaming application may be accomplished through a grouping manager, such as grouping manager 332 (FIG. 3). The grouping manager 332 may be configured to monitor a streaming application during runtime to identify locations within an operator graph at which tuples may be grouped. Grouping tuples may improve the performance of a streaming application.

At operation 620, a grouping manager, e.g., grouping manager 332, may group tuples based on whether the grouping manager 332 identifies a pattern exhibited during the runtime of a streaming application, according to some embodiments. This may include (as further described in FIG. 7) identifying output patterns based on: a tuple count, a period of time, a windowing condition, a value of an attribute within a tuple, or a punctuation, in some embodiments. At operation 630, the grouping manager 332 may group tuples based on a trial and error method which may include performance metrics as a guide, in some embodiments. Operation 630 may generally be considered a trial and error method of optimizing runtime tuple grouping based on system performance metrics. Operation 630 is discussed in further detail below in accordance with FIG. 8. At operation 640, the grouping manager 332 may group tuples based on monitoring a system profile, according to some embodiments. Operation 640 may generally be considered a method of grouping tuples to preserve system resources, thereby improving application performance. Operation 640 is discussed in further detail below in accordance with FIG. 9.

A grouping manager, e.g., grouping manager 332 (FIG. 3), may be configured to include operations 620-640 in some embodiments. In other embodiments, the grouping manager 332 may be configured to include any one of the operations 620-640, or any combination of the operations 620-640. A grouping manager may be configured to include operations 620-640 in some embodiments. In some embodiments, however, an application programmer may disable the grouping manager 332. Operations 620-640 may, in some embodiments, run concurrently. In other embodiments, the operations 620-640 may run sequentially. In such an embodiment, the order may not affect the streaming application.

At operation 650, processing according to the operator graph of the streaming application may continue, according to some embodiments. Continuing processing may include grouping of tuples if any runtime grouping conditions were added in the preceding operations. Continuing processing may also include a grouping manager, e.g., grouping manager 332, continuing to monitor the application, as shown by the arrow in FIG. 6 indicating that the method 600 may repeat throughout the runtime of the streaming application.

Figure 7:
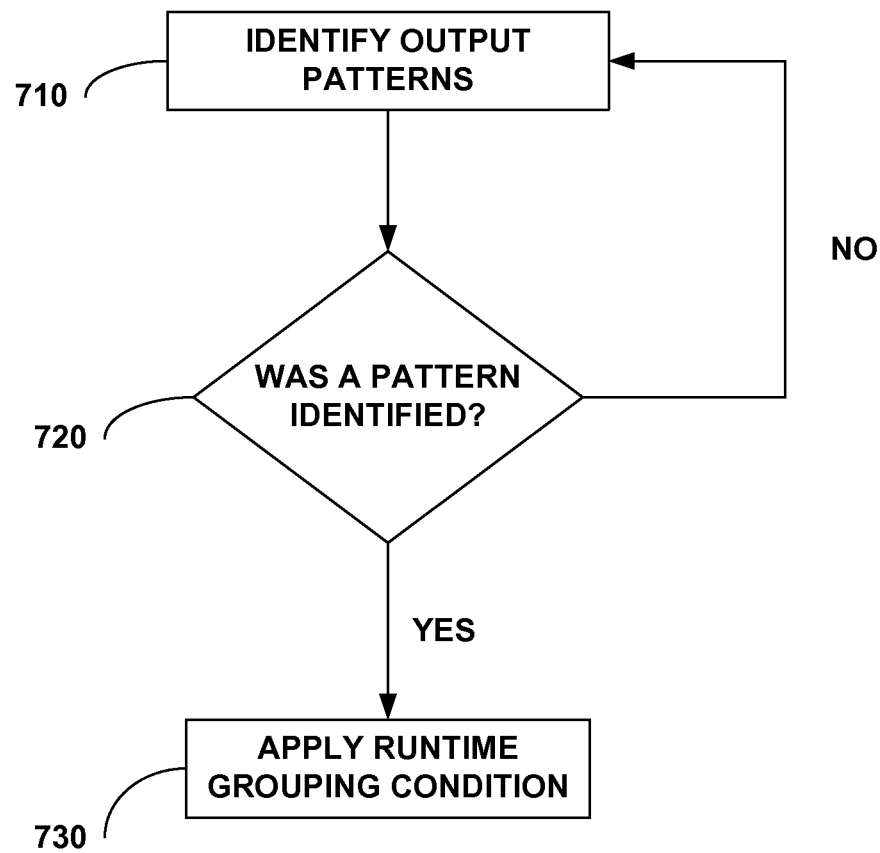
FIG. 7 illustrates a method for grouping tuples during runtime including identifying an output pattern, according to various embodiments.

FIG. 7 is a flowchart illustrating a method 700 corresponding to operation 620 (FIG. 6) to group tuples based on the runtime identification of an output pattern, according to some embodiments. At operation 710, a grouping manager, e.g., grouping manager 332 (FIG. 3), may identify an output pattern. An output pattern may generally be considered to be a recurring output during runtime of a streaming application. An output pattern may be identified at a particular stream operator in some embodiments. Output patterns may be identified within a particular group of stream operators, at a particular processing element, or within a group of processing elements in other embodiments. Output patterns may include patterns that are based on: a tuple count, a period of time, a windowing condition, a value of an attribute within a tuple, or a punctuation. A punctuation is a control signal that appears interleaved with the tuples in a data stream. The punctuation may, for example, notify the stream operator of the grouping of tuples to be processed.

A window, as referred to herein, is a logical container for tuples received by an input port of a stream operator. Windowing may allow for creation of subsets of data within a streaming application. A stream operator may not necessarily support windowing by default. A stream operator may, however, be configured to support windowing. Both tumbling and sliding windows may store tuples according to various conditions. A tumbling window may store incoming tuples until the window is full, then may trigger a stream operator behavior, flush all stored tuples from the window, and then may begin this process again. Conversely, a sliding window does not automatically flush the window when the trigger condition is fulfilled. A sliding window also has an eviction policy that tells the window when to flush the window and begin this process again. These conditions may be referred to herein as windowing conditions. Windowing may be defined in any number of ways. For example, an application programmer may define one or more specific windowing conditions. Additionally, the system may provide a set of windowing conditions.

A grouping manager, e.g., grouping manager 332, may, for example, identify a stream operator that outputs one tuple for every five tuples received. In another embodiment, the grouping manager 332 may identify a stream operator that outputs a tuple whenever it receives a punctuation. The grouping manager 332 may also identify a stream operator receiving input from two or more stream operators that outputs one tuple whenever it receives an input from a particular stream operator of the two or more input stream operators, in some embodiments. In other embodiments, the grouping manager 332 may identify a stream operator that produces output only after receiving one or more input streams from multiple operators.

At operation 720, a grouping manager, e.g., grouping manager 332 (FIG. 3), may determine whether a pattern was identified and modify processing accordingly. If the grouping manager 332 was able to identify an output pattern, then it may apply a runtime grouping condition at operation 730 (discussed below). A runtime grouping condition may be based on the output pattern that was identified. Conversely, if the grouping manager 332 is unable to identify an output pattern during runtime, i.e., the grouping manager did not identify a grouping location, the grouping manager 332 may continue to attempt to identify output patterns. In some embodiments, even when the grouping manager 332 is able to identify an output pattern during runtime, the grouping manager 332 may still continue to attempt to identify additional output patterns.

At operation 730, the grouping manager 332 may modify processing at one or more stream operators, in some embodiments. The modification to the one or more stream operators may include adding a runtime grouping condition within the grouping location identified by the grouping manager 332. In other embodiments, the modification may include adding a runtime grouping condition at a processing location, which may be the same as or different than the grouping location. The runtime grouping condition may notify one or more stream operators to group tuples based on a corresponding output pattern. When processing a group of tuples, a stream operator may execute a process n times, where n is the number of tuples that was included in the group.

If a grouping manager, e.g., grouping manager 332, identified a grouping location at operation 710 in which a stream operator outputs one tuple for every five tuples received, the grouping manager 332 may apply a runtime grouping condition such that tuples are sent to that particular stream operator in groups containing five tuples. The grouping manager 332 may also modify the processing to include a group size that is greater than one, but less than five. If the grouping manager 332 identified a grouping location in which a stream operator outputs one tuple every ten seconds the streaming application is running, the grouping manager 332 may add a runtime grouping condition to a processing location such that tuples are grouped for some amount of time less than ten seconds prior to sending the group to the particular stream operator that exhibits the pattern. In some embodiments, the processing location and the grouping location may be different.

Figure 8:
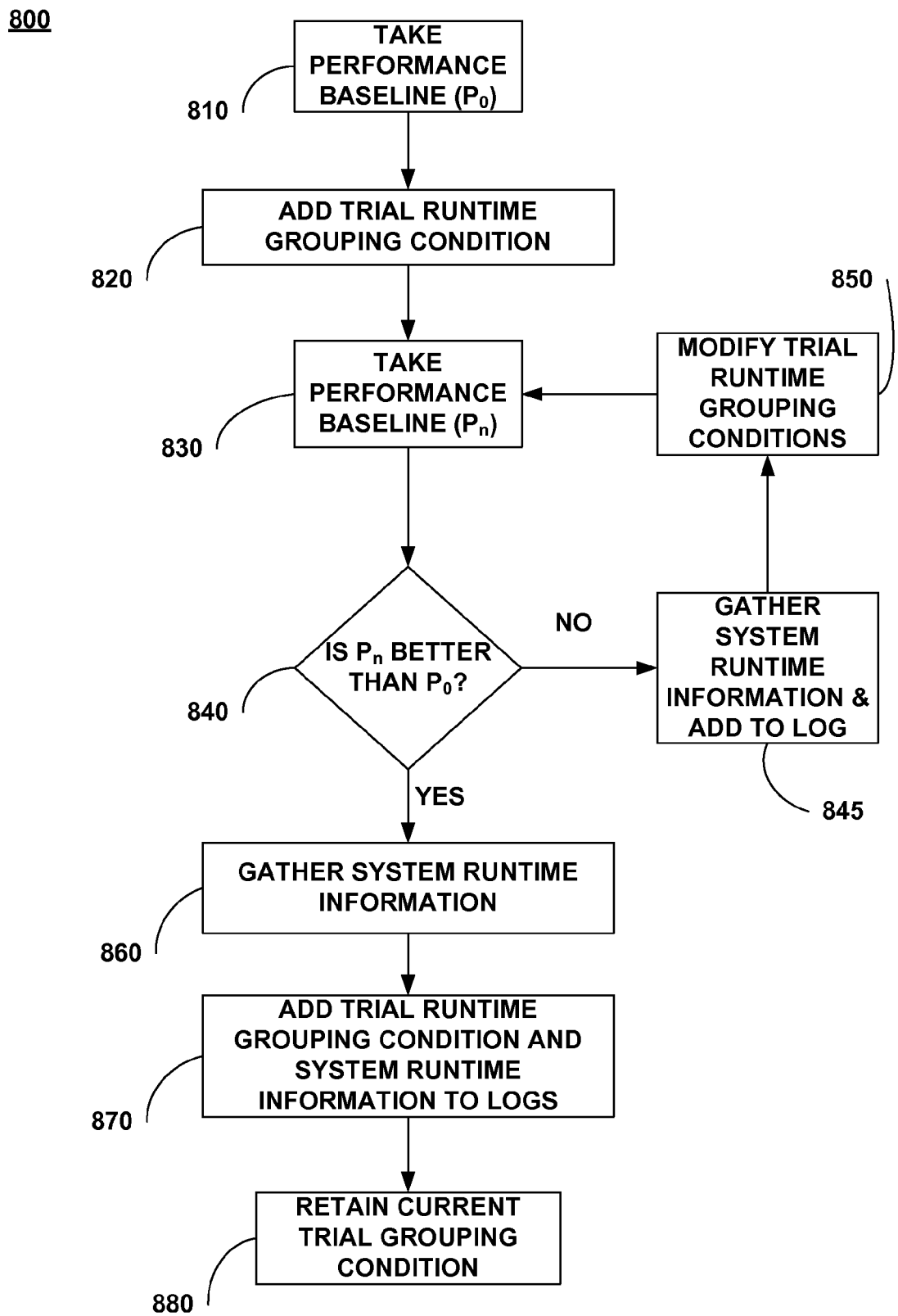
FIG. 8 illustrates a method for optimizing a grouping of tuples during runtime according to performance guidance, according to various embodiments.

FIG. 8 is a flowchart illustrating a method 800 corresponding to operation 630 (FIG. 6) to group tuples based on a trial and error method to optimize tuple grouping within an operator graph of a streaming application, according to some embodiments. At operation 810, a grouping manager, e.g., grouping manager 332 (FIG. 3), may be configured to take a performance metric baseline $P_0$. The performance metric baseline may include information relating to a portion of the application or the entire application, according to some embodiments. Performance metrics may include, for example, CPU utilization, number of processing elements on a compute node, network interface controller/card (NIC) bandwidth remaining, or other similar performance indicators. In some embodiments, the performance metrics may also include information regarding processing times, such as the average amount of time a tuple spends in an operator graph, the average amount of time an operator takes to process a tuple, the average amount of time a group of operators takes to process a tuple, or other similar indicators of the streaming application's performance. In some embodiments, the grouping manager 332 may write the performance baseline $P_0$ to a memory.

At operation 820, a grouping manager, e.g., grouping manager 332 (FIG. 3), may add a trial runtime grouping condition. As referred to herein, a trial runtime grouping condition is a runtime grouping condition that is added to a streaming application by the grouping manager 332 that may, in some embodiments, be retained in the operator graph if performance metrics improve (discussed in further detail at operation 870). A trial runtime grouping condition may be similar to a runtime grouping condition. The grouping manager 332 may identify a grouping location using various methods. For example, in some embodiments, the grouping manager 332 may identify a potential grouping location based on a system default. In other embodiments, the grouping manager 332 may identify a potential grouping location based on an input received from a compiler or provided by an application programmer. In yet other embodiments, the grouping manager 332 may identify a grouping location based on the output pattern method described in operation 700.

At operation 830, a grouping manager, e.g., grouping manager 332 (FIG. 3), may take a new performance baseline $P_n$, according to some embodiments. This performance baseline $P_n$ may be an indication of whether the trial runtime grouping condition improved the performance of the streaming application. In some embodiments, similar metrics to the initial performance baseline $P_0$ may be taken. At operation 840, the grouping manager 332 may determine whether the performance baseline $P_n$ shows an improvement in the performance of the streaming application as compared to the initial performance baseline $P_0$. For example, operation 840 may determine that the trial runtime grouping condition decreased the amount of time one or more stream operators takes to process one or more tuples. If the grouping manager 332 determines at operation 840 that the performance baseline $P_n$ indicates a decreased performance of the streaming application, the grouping manager 332 may take a snapshot of the system and log the snapshot along with the trial grouping condition at operation 845 in order to keep records of attempted runtime grouping conditions. The snapshot may include system details similar to those identified by the performance baseline of operations 810 and 830.

At operation 850, the grouping manager 332 may modify the trial runtime grouping condition and repeat operations 830 and 840. In some embodiments, operations 830-850 may be repeated n number of times before the operation 800 is ended. The number n may be based on the potential number of grouping combinations. In other embodiments, the operation 800 may run for a period of time, at the end of which the trial runtime grouping condition providing the best performance may be retained. Conversely, if the grouping manager 332 determines at operation 840 that the performance baseline $P_n$ indicates improved performance of the streaming application, the grouping manager 332 may take a snapshot of the system at operation 860. The snapshot may include system details similar to those identified by the performance baseline of operations 810 and 830. At operation 870, the grouping manager 332 may log the snapshot of the system and include the trial runtime grouping condition in the log as well, according to some embodiments. At operation 880, the grouping manager 332 may retain the trial grouping condition as the runtime grouping condition.

Figure 9:
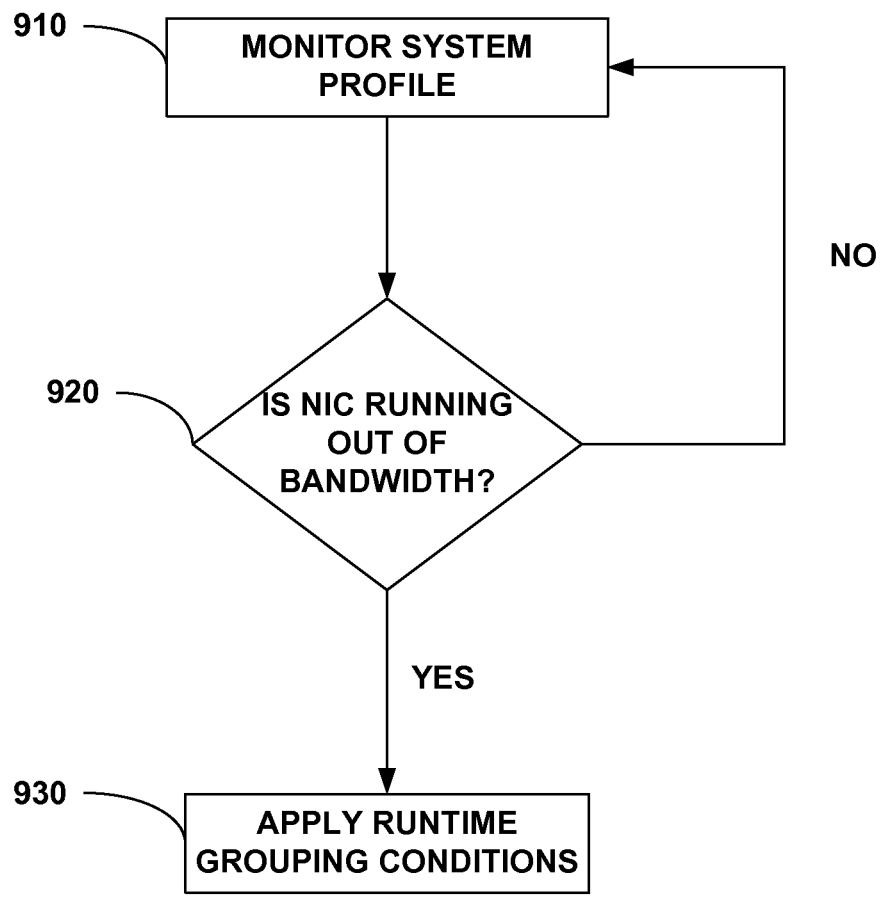
FIG. 9 illustrates a method for grouping tuples during runtime including a system profile observation, according to various embodiments.

FIG. 9 is a flowchart illustrating a method 900 corresponding to operation 640 (FIG. 6) to group tuples based on monitoring a system profile, according to some embodiments. At operation 640, a grouping manager, e.g., grouping manager 332, may be configured to monitor a system profile during runtime execution of a streaming application. A "system" as referred herein may include one or more compute nodes, such as compute node 110 (FIG. 2), according to some embodiments. The system profile may include information related to one or more network interface controllers/cards (NIC) of a system in some embodiments. This information may, for example, include the remaining available bandwidth on the NIC. At operation 720, the grouping manager 332 may determine whether the NIC is running low on bandwidth. In some embodiments, the point at which the grouping manager 332 decides that a NIC has crossed a bandwidth threshold may be a user-defined value input by the application programmer. In other embodiments, the NIC threshold may be identified as a system default value. In yet other embodiments, a system default threshold may be overridden by an application programmer. The NIC threshold may also be determined historically in some embodiments. If the runtime manager 332 identifies a NIC running low on bandwidth during runtime execution of a streaming application, the runtime manager 332 may identify grouping locations within the operator graph.

For example, it may be possible to group tuples prior to sending to a stream operator that outputs one tuple every five seconds, but the receiving tuple only outputs one tuple every fifteen seconds. In such a case, it may be possible to send a group of tuples every ten seconds. In addition to time-based grouping locations, grouping may be possible based on identification of locations based on windowing conditions, tuple counts, punctuation, tuple attribute values, or any combination thereof. In some embodiments, grouping tuples may be discontinued after the NIC bandwidth is back above the provided threshold.

At operation 930, a grouping manager, e.g., grouping manager 332, may modify processing at one or more stream operators within a grouping location identified in operation 910. In other embodiments, the modification may be at a processing location, which may be the same as or different than the grouping location identified in operation 910. The modification to the one or more stream operators may include adding a runtime grouping condition. The runtime grouping condition may notify one or more stream operators to group tuples based on a corresponding system profile characteristic. When processing a group of tuples, a stream operator may execute a process n times, where n is the number of tuples that was included in the group.

If a grouping manager, e.g., grouping manager 332, identified a grouping location based on a system profile characteristic at operation 910, the grouping manager 332 may add a runtime grouping condition to a stream operator within the operator graph at operation 930. In some embodiments, this runtime grouping condition may be added to one or more stream operators within the grouping location that was identified by the grouping manager 332. In other embodiments, the runtime grouping condition may be added to a processing location, which may be the same as or different than the grouping location.

In some embodiments, for example, if the NIC bandwidth is below a specified threshold, a grouping manager, e.g., grouping manager 332, may group tuples prior to sending to a particular stream operator that outputs one tuple after fifty tuples are received. The grouping may, for example, indicate that fifty tuples are to be grouped prior to sending to this particular stream operator, thereby reducing the number of times the NIC is used. In addition to count-based locations, grouping may be possible at locations based on windowing conditions, processing time, punctuation, tuple attribute values, or any combination thereof. In some embodiments, it may be possible to stop grouping tuples after the NIC bandwidth is back above the provided threshold.

Figure 10:
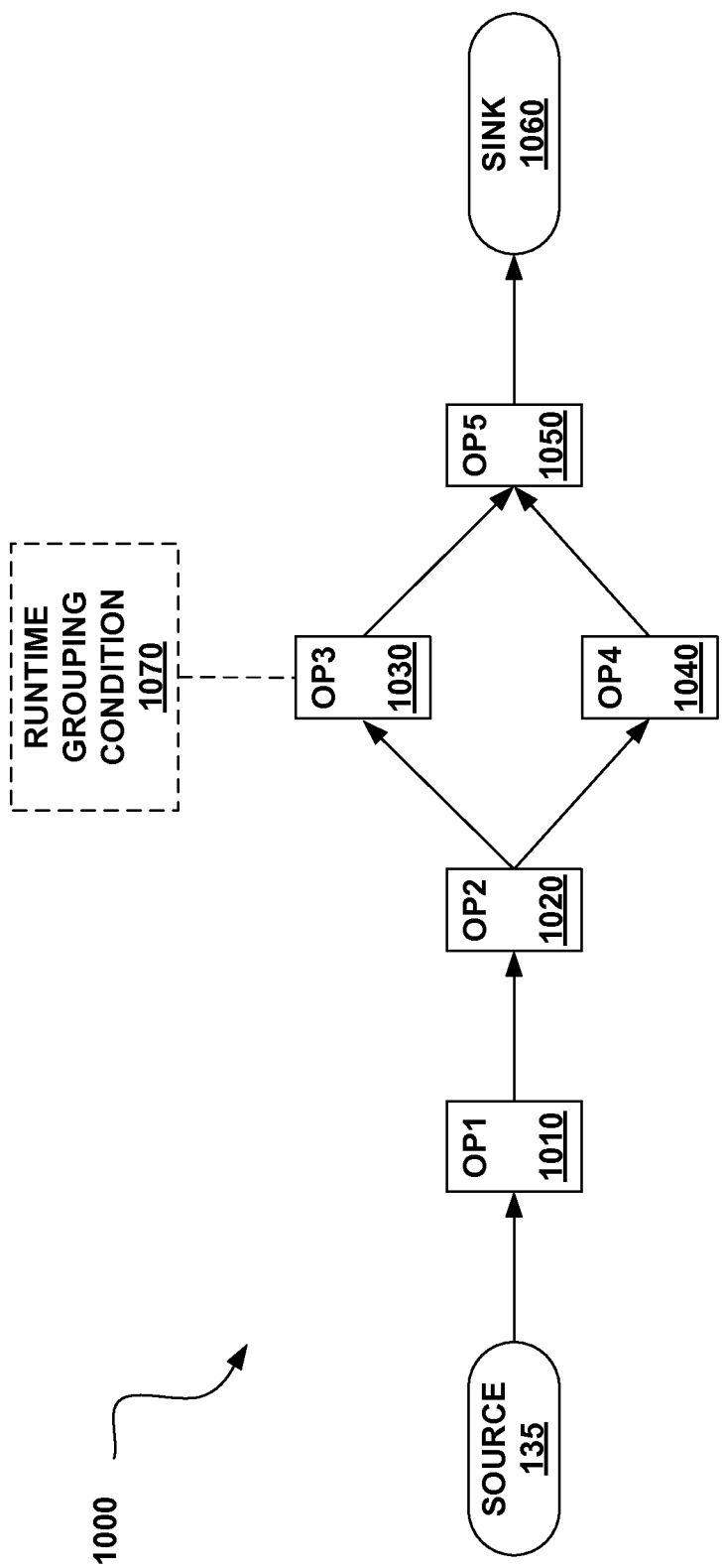
FIG. 10 illustrates a more detailed view of an operator graph including a tuple grouping process, according to various embodiments.

FIG. 10 shows a more detailed view of operator graph 1000 of a streaming application in which incoming tuples may be grouped, according to some embodiments. Operator graph 1000 shows a simplified execution path for illustrative purposes. In some embodiments, a grouping manager, e.g., grouping manager 332 (FIG. 3), may be configured to monitor a streaming application during runtime execution. The grouping manager 332 may identify grouping locations. For example, the grouping manager 332 may identify that stream operator 1030 outputs one tuple for every five tuples that it receives. The grouping manager 332 may be able to add a runtime grouping condition based on this output pattern to a stream operator within the operator graph 1000. For example, in some embodiments, the grouping manager 332 may add a grouping condition to stream operator 1020 such that stream operator 1020 outputs a group of tuples containing five tuples instead of sending five individual tuples to stream operator 1030. This may improve the performance by reducing the number of calls that stream operator 1020 has to make to the transport layer.

In other embodiments, the grouping manager 332 may determine that the NIC is running low on remaining available bandwidth. The grouping manager 332 may then identify grouping locations at which grouping may reduce the number of calls to the transport layer in an attempt to decrease the load on the NIC. For example, the grouping manager 332 may identify that stream operator 1030 outputs one tuple every five seconds. Stream operator 1050 may also output one tuple every ten seconds. In this case, the grouping manager 332 may identify that it is possible to group tuples prior to sending from stream operator 1030 to stream operator 1050 without affecting the performance of stream operator 1050. This may be accomplished by adding runtime grouping condition 1070 to stream operator 1030. In some embodiments, runtime grouping condition 1070 may group tuples prior to sending every ten seconds. Grouping tuples prior to sending them to stream operator 1030 may reduce the number of calls made to the transport layer, which may increase the amount of available bandwidth on the NIC.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language such as Java, Smalltalk, C++, or the like; (b) conventional procedural programming languages, such as the "C" programming language or similar programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

While the foregoing is directed to exemplary embodiments, other and further embodiments of the invention may be devised without departing from the basic scope thereof, and the scope thereof is determined by the claims that follow.

What is claimed is:

1. A method for processing a stream of tuples, comprising:
   receiving a stream of tuples to be processed by a plurality of processing elements operating on one or more computer processors, each processing element having one or more of a plurality of stream operators, the plurality of stream operators including a first stream operator and a second stream operator
   determining, an output pattern at the second stream operator, the determining an output pattern includes determining that the second stream operator outputs a first quantity of one or more tuples for every second quantity of one or more tuples that the second stream operator receives, the first and second quantity of one or more tuples being included in the stream of tuples;
   identifying, based on the output pattern, a grouping location within the plurality of stream operators; and
   modifying, during runtime, processing at the first stream operator, the modifying including adding a runtime grouping condition to the first stream operator based on the second quantity of one or more tuples that the second stream operator receives such that the first stream operator groups a third quantity of one or more tuples that matches the second quantity of one or more tuples that the second stream operator receives, wherein the first stream operator sends the grouped third quantity to the second stream operator.

2. The method of claim 1, wherein the grouping location includes a plurality of stream operators.

3. The method of claim 1, wherein the grouping location includes the second stream operator configured to write output to a memory.

4. The method of claim 1, further comprising:
   determining a first performance metric for a portion of the plurality of processing elements;
   determining, subsequent to modifying processing at the first stream operator, a second performance metric for the portion of the plurality of processing elements;
   determining that the second performance metric is worsened relative to the first performance metric; and
   modifying, in response to determining that the second performance metric is worsened relative to the first performance metric, processing at the first stream operator by adding another runtime grouping condition to the first stream operator such that the first stream operator groups another plurality of tuples to send to the second stream operator.

5. The method of claim 1, wherein the output pattern includes generating an output in response to a particular time period having elapsed and the third quantity of tuples selected for inclusion in the group is determined to include tuples received at the first stream operator during the particular time period.

6. The method of claim 1, wherein the output pattern at the second stream operator includes generating an output in response to a particular windowing condition having been met and the third quantity of tuples selected for inclusion in the group at the first stream operator is determined to include tuples received at the first stream operator that satisfy the windowing condition.

7. The method of claim 1, wherein the output pattern includes generating an output in response to receiving a tuple having a particular attribute value as input from the first stream operator and the third quantity of tuples selected for inclusion in the group is determined to include a tuple having the particular attribute value.

8. The method of claim 1, wherein the output pattern includes generating an output in response to receiving a punctuation as input from the first stream operator and the third quantity of tuples selected for inclusion in the group is determined to include the punctuation, wherein the punctuation is a control signal that is interleaved with the stream of tuples in order to notify the first stream operator to group the third quantity.

9. A method for processing a stream of tuples, comprising:
receiving a stream of tuples to be processed by a plurality of processing elements operating on one or more computer processors, each processing element having one or more of a plurality of stream operators, the plurality of stream operators including a first stream operator and a second stream operator configured to receive tuples only from the first stream operator;
determining, an output pattern at the second stream operator;
identifying, based on the output pattern, a grouping location within the plurality of stream operators; and
modifying, during runtime, processing at the first stream operator, the modifying including adding a runtime grouping condition to the first stream operator such that the first stream operator groups a plurality of tuples to send to the second stream operator, wherein the plurality of tuples selected for inclusion in the group at the first stream operator are determined based on a trial and error method, the trial and error method including:
taking a first plurality performance metric baselines based on: CPU utilization, a number of processing elements on a compute node, network interface controller/card (NIC) bandwidth remaining, an average amount of time the second operator takes to process a tuple, and an average amount of time the tuple spends in the operator graph;
adding a trial runtime grouping condition, the trial runtime grouping condition being a potential runtime grouping condition that is retained in the operator graph when performance metrics improve;
taking a second plurality of performance metric baselines;
determining, by comparing the first plurality of performance metric baselines with the second plurality of performance metric baselines, that the second plurality of performance metric baselines are an improvement over the first plurality of performance metric baselines; and
retaining the trial runtime grouping condition as the runtime grouping condition.

10. A method for processing a stream of tuples, comprising:
receiving a stream of tuples from a single source to be processed by a plurality of processing elements operating on one or more computer processors, each processing element having one or more of a plurality of stream operators, the plurality of stream operators including a first stream operator and a second stream operator;
determining that a bandwidth of a Network Interface Card (NIC) is below a specified bandwidth threshold;
identifying, based on the determining, a grouping location within the plurality of stream operators; and
modifying, during runtime, processing at the first stream operator, the modifying including adding a runtime grouping condition to the first stream operator such that the first stream operator groups a plurality of tuples, of the stream of tuples from a single source, to send to the second stream operator to reduce a number of times the NIC is used.

* * * * *